United States Patent [19]

Keys

[11] Patent Number: 5,830,842
[45] Date of Patent: *Nov. 3, 1998

[54] HYDROXYESTERS AS COUPLING AGENTS FOR SURFACTANT FORMULATIONS

[75] Inventor: Robert O. Keys, Columbus, Ohio

[73] Assignee: Witco Corporation, Greenwich, Conn.

[ * ] Notice: The term of this patent shall not extend beyond the expiration date of Pat. No. 5,824,635.

[21] Appl. No.: 638,614

[22] Filed: Apr. 26, 1996

[51] Int. Cl.$^6$ .................................................. C11D 1/38
[52] U.S. Cl. ........................... 510/437; 510/504; 510/505
[58] Field of Search ..................... 510/123, 126, 510/421, 422, 434, 461, 433, 501, 502, 504, 505, 515, 437

[56] References Cited

U.S. PATENT DOCUMENTS

| | | | |
|---|---|---|---|
| 3,666,668 | 5/1972 | Klausner | 252/90 |
| 3,770,643 | 11/1973 | Heiba et al. | 252/117 |
| 3,928,212 | 12/1975 | Goto et al. | 252/8.6 |
| 4,917,955 | 4/1990 | Porter, Jr. et al. | 428/413 |
| 5,185,088 | 2/1993 | Hartman et al. | 252/86 |
| 5,358,647 | 10/1994 | Puentes-Bravo et al. | 252/8.6 |
| 5,496,492 | 3/1996 | Hamada et al. | 252/170 |
| 5,507,971 | 4/1996 | Ouzounis et al. | 252/174.24 |

FOREIGN PATENT DOCUMENTS

| | | |
|---|---|---|
| 3255021 | 11/1991 | Japan . |
| 5262638 | 10/1993 | Japan . |
| WO92/08442 | 5/1992 | WIPO . |
| WO93/12774 | 7/1993 | WIPO . |

OTHER PUBLICATIONS

I. Ikeda, X. P. Gu, I. Miyamoto, M. Okahara, Journal of American Oil Chemistry Society Jun. 1989, vol. 66, 822–824.

S. N. Zlatanos, A. N. Sagredos, V. P. Papageorgiou, Journal of American Oil Chemistry Society Nov. 1985, vol. 62, 1575–1577.

*Primary Examiner*—Paul Lieberman
*Assistant Examiner*—John R. Hardee
*Attorney, Agent, or Firm*—Edward K. Welch, II; Andrew S. Reiskind; Timothy X. Witkowski

[57] ABSTRACT

Disclosed are stable monophasic liquid compositions comprising water, one or more cationic, anionic, amphoteric and/or nonionic surfactants, exhibiting partial solubility in water or in concentrated formulations, and one or more coupling agents of the formula (1)

$$R^A\text{—}C(O)O\text{—}R^C\text{—}(OC(O)R^E)_{0-1} \qquad (1)$$

wherein $R^A$ is $C_1$–$C_{15}$ alkyl with 0–3 hydroxyl substituents, $R^C$ is $C_1$–$C_{10}$ alkyl with 0–3 hydroxyl substituents, and $R^E$ is $C_1$–$C_{15}$ alkyl with 0-1 hydroxyl substituents, wherein the compounds of formula (1) contain 7 to 16 carbon atoms and a total of 1–3 hydroxyl substituents.

11 Claims, No Drawings

HYDROXYESTERS AS COUPLING AGENTS FOR SURFACTANT FORMULATIONS

BACKGROUND OF THE INVENTION

The present invention relates to aqueous compositions containing solubilized or dispersed therein one or more useful surfactants which exhibit low solubility (or no solubility at all) in water, especially in the presence of electrolytes and/or pH agents. For purposes of this application, a substance is considered to be "solubilized" in water if the material is dissolved in the water or if it is uniformly dispersed or distributed therein, or emulsified therein, so as to exhibit the physical appearance and physical properties of a single-phase system (whether as an emulsion, an organic-based formula, or a water-based formula).

As is well known, surfactants can be used to perform a wide variety of useful purposes, ranging from cleaning and surface protection through deposition of coatings, fabric softening, foam stabilization, oil recovery, asphalt emulsification, achieving or enhancing rewetting effectiveness and penetrating power, and a large variety of other capabilities set forth hereinbelow. However, in many cases the ability to take advantage of such surfactants' useful properties is limited by the low solubility and/or dispersibility of many surfactants and surfactant blends in water.

There is also need in the marketplace for products with higher levels of concentration of surfactants or active ingredients, thus minimizing the amounts of water in the products. As the amount of water in the formulations is reduced, and as formulations add more (and more complex) ingredients, the fluidity and stability often become more difficult to maintain. Often the surfactants become insoluble gels when diluted in water, or become hazy or even split into different phases. Surfactants often become insoluble in formulations where the concentration of inorganic salts is very high. In other surfactant formulations, maintaining the fluidity and dispersibility of the surfactant in water are serious problems which limit their use and application. Many surfactants are difficult to even disperse in water, requiring both hot water and long periods of mixing for dissolution into solution.

Hydrotropes or, more generally, coupling agents are added to surfactant formulations to increase the amount of the relatively water-insoluble surfactants that can be solubilized into the system. In most cases, they do not act as surfactants to lower surface tension but they often allow surfactants in the presence of salts or electrolytes to be added and subsequently dispersed into water at higher concentrations or at lower viscosities of the formulation than is otherwise achieved using only surfactant and water. These coupling agents assist surfactants by increasing the surfactant's solubility in water and its stability in the formulation, especially in the presence of salts, electrolytes and/or pH agents.

Hydrotropes or coupling agents generally contain short chained ($C_2$–$C_6$) hydrophobes with more bulky hydrophilic group(s) such as hydroxyl and/or sulfonates making them completely water-soluble. They are normally added to stabilize formulations of surfactants, salts and water and to hold them in single-phase systems.

Materials that have been proposed for use as coupling agents include hexylene glycol, propylene glycol, dipropylene glycol, diethylene glycol, propylene carbonate, any of various lower alkoxy-capped glycols or polyglycols, particularly where the glycol is ethylene glycol or propylene glycol, such as ethylene glycol monobutyl ether, alcohols such as isopropanol and ethanol, and certain aryl sulfonates such as sodium naphthalene sulfonate and sodium xylene sulfonate, as well as some phosphate esters. However, despite the abilities of these water-soluble products as coupling agents that have been suggested for these materials, there remains a need and an interest in identifying coupling agents and systems containing such coupling agents which not only exhibit superior stability and superior ability to solubilize relatively water-insoluble agents but also improve formulation fluidity, dispersiblity and product performance.

In addition, coupling agents that have improved permissible-exposure limits, higher flash points (over, for instance, isopropanol and ethanol), and lower odor (compared to, for example, butyl cellosolve or isopropanol) would have substantial importance to formulations and consumers. Other coupling agents such as sodium xylene sulfonate containing aromatic rings have come under environmental scrutiny in recent times.

The composition disclosed in U.S. Pat. No. 4,692,277 represents an attempt to incorporate certain diol solvents into hard surface cleaning formulations. The disclosure, however, is limited to liquid hard surface detergents/cleaners which contain at most 10% of a surfactant, and which must contain 1% to 30% of a detergency builder salt. The necessity of these components in the indicated amounts attests to the specific, limited nature of the teachings of this patent. More fundamentally, the disclosure of this patent was concerned solely with the solvent power of $C_6$–$C_{16}$ diols as to their effect on soap scum removal when combined with both surfactants and salt builders, and completely fails to suggest or appreciate that it is possible, through selection of components according to the present invention, to employ certain diols and/or alkoxylates thereof so as to attain the solubilization of much higher amounts of less soluble surfactant(s) while retaining the desired monophasic state of the resulting composition. Thus, in turn, this patent thereby also fails to suggest any of the many end-use (especially monophasic) formulations that can be prepared embodying the compositions afforded by the present invention in combination with other hydrophobic surfactants, be they active ingredients or otherwise.

BRIEF SUMMARY OF THE INVENTION

One aspect of the present invention resides in a stable monophasic liquid composition characterized by the ability to solubilize increased amounts of surfactant into said composition while retaining an essentially monophasic state, which composition is useful as a dispersant of hydrophobic material and as a foam stabilizer, comprising water;

one or more surfactants selected from the group consisting of cationic surfactants, anionic surfactants, amphoteric surfactants, and nonionic surfactants, and mixtures thereof; and a coupling agent selected from the group consisting of compounds of formula (1)

$$R^A\text{—C(O)O—}R^C\text{—(OC(O)}R^E)_{0-1} \tag{1}$$

and mixtures thereof, wherein $R^A$ is straight, cyclic or branched alkyl containing 1–14 carbon atoms, and $R^A$ is optionally substituted with 1 to 3 hydroxyl groups; and wherein $R^C$ is straight, cyclic or branched alkyl containing 1 to 10 carbon atoms, optionally substituted with 1 to 3 hydroxyl groups, and $R^C$ can optionally be substituted with a group of the structure —OC(O)—$R^E$ wherein $R^E$ is straight, cyclic or branched alkyl containing 1 to 14 carbon atoms which is optionally substituted with a hydroxyl group.

The compounds of formula (1) should contain 7 to 16 carbon atoms, and should be substituted with a total of 1 to 3 hydroxyl groups. Preferably said coupling agent is present in an amount effective to increase the amount of said one or more surfactants that can be solubilized in said monophasic liquid composition.

Another aspect of the invention is the method of increasing the amount of cationic, anionic, amphoteric, or nonionic surfactant or a mixture of two or more thereof that can be solubilized in water, especially as to surfactants which exhibit low solubility in water, the method consisting of solubilizing together water, one or more of said surfactants, and a coupling agent selected from the group consisting of compounds of formula (1)

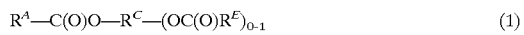
$$R^A\text{—}C(O)O\text{—}R^C\text{—}(OC(O)R^E)_{0-1} \qquad (1)$$

and mixtures thereof, wherein $R^A$ is straight, cyclic or branched alkyl containing 1–14 carbon atoms, and $R^A$ is optionally substituted with 1 or 2 hydroxyl groups; and wherein $R^C$ is straight, cyclic or branched alkyl containing 1 to 10 carbon atoms, which is optionally substituted with a hydroxyl group, and $R^C$ can optionally be substituted with a group of the structure —OC(O)—$R^E$ wherein $R^E$ is straight, cyclic or branched alkyl containing 1 to 14 carbon atoms which is optionally substituted with a hydroxyl group. The compounds of formula (1) should contain 7 to 16 carbon atoms and should be substituted with a total of 1 to 3 hydroxyl groups. Preferably said coupling agent is present in an amount effective to increase the amount of said surfactant that can be solubilized in the resulting aqueous composition.

DETAILED DESCRIPTION OF THE INVENTION

The present discovery has particular utility with surfactants that are either insoluble in water, or exhibit partial solubility in water such as up to 10 grams per 100 milliliters of water (in the absence of surfactants, coupling agents, or other solubility-enhancing additives). However, the present discovery also is useful with surfactants which exhibit even complete solubilities in water but which are difficult to disperse or to produce fluid, low viscosity formulations in water, and/or highly concentrated surfactant blends with or without electrolytes, builders and/or pH agents or other active agents.

Satisfactory surfactants useful herein can readily be identified in well-known sources such as McCutcheon's Detergents & Emulsifiers, and the CTFA Cosmetic Ingredient Dictionary.

Anionic surfactants include in particular organosulfonates and organosulfates, which can be characterized by the formula $X^1$–$A^1$ wherein $A^1$ denotes sulfonate or sulfate, attached anywhere to $X^1$ and most often at one end of $X^1$, and $X^1$ denotes:

alkyl containing 6 to 40 carbon atoms, optionally substituted with 1 to 10 hydroxyl groups, and optionally substituted with aryl (particularly phenyl) which is optionally substituted with one or more alkyl or alkylene groups containing 1 to 20 carbon atoms and up to 3 carbon—carbon double bonds;

alkylene containing 6 to 40 carbon atoms and 1 to 6 carbon—carbon bonds, and optionally substituted with 1 to 10 hydroxyl groups, and optionally substituted with aryl (particularly phenyl) which is optionally substituted with one or more alkyl or alkylene groups containing 1 to 20 carbon atoms and up to 3 carbon—carbon double bonds;

amides and esters containing a total of 6 to 50 carbon atoms and optionally containing 1 to 6 carbon—carbon double bonds;

polyalkoxy segments, particularly homopolymers, random copolymers, and block copolymers, of ethylene oxide and/or propylene oxide, containing 2 to 200 alkoxy units, per se or terminated with alkyl or alkylene containing 2 to 40 carbon atoms, which may optionally be substituted with 1–10 hydroxyl groups, or terminated with aryl (particularly phenyl) which may optionally be substituted with one or more alkyl or alkylene groups containing 1 to 20 carbon atoms and up to 3 carbon—carbon double bonds.

The anionic component is counterbalanced by a cation X which is preferably an alkali metal (e.g. sodium, potassium or lithium).

Cationic surfactants include quaternary ammonium compounds, particularly those of the formula

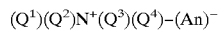
$$(Q^1)(Q^2)N^+(Q^3)(Q^4)\text{–}(An)^-$$

wherein (An)⁻ is an anion such as halide (especially bromide or chloride), methylsulfate, or ethylsulfate, and $Q^1$, $Q^2$, $Q^3$ and $Q^4$ are selected such that 2 or 3 thereof are $C_{1-4}$ alkyl (optionally one of which is benzyl) and 1 or 2 thereof are alkyl or alkylene containing 8 to 24 carbon atoms and optionally up to 3 carbon—carbon double bonds, or $Q^1$ and $Q^2$ are acyl oxyethyl wherein the acyl moiety contains 8 to 22 carbon atoms and 0 to 3 carbon—carbon double bonds, or poly(alkoxy) wherein each alkoxy unit is ethoxy or propoxy, containing up to 200 alkoxy units. Also included are polymeric quaternary ammonium salts including those known generically as polyquatermium -1, -2, -4, -5, -6, -7, -8, -9, -10, -11, -12, -13, and -14.

Amphoteric surfactants particularly include those of the formula (IVa) and (IVb)

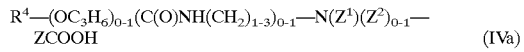
$$R^4\text{—}(OC_3H_6)_{0-1}(C(O)NH(CH_2)_{1-3})_{0-1}\text{—}N(Z^1)(Z^2)_{0-1}\text{—}ZCOOH \qquad (IVa)$$

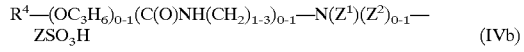
$$R^4\text{—}(OC_3H_6)_{0-1}(C(O)NH(CH_2)_{1-3})_{0-1}\text{—}N(Z^1)(Z^2)_{0-1}\text{—}ZSO_3H \qquad (IVb)$$

salts thereof with an alkali metal X or ammonium cation and mixtures of any said compounds and salts, wherein X is as defined above, $R^4$ is straight or branched alkyl or alkylene, or cyclic or heterocyclic aromatic which is optionally substituted with alkyl, and contains 4 to 40 carbon atoms and 0–3 carbon—carbon double bonds, $Z^1$ and $Z^2$ are independently of each other H, $C_fH_{2f+1}$ or $C_fH_{2f}OH$ wherein f is 1 to 6 and preferably 1, Z or 3 or, in formula (IVa), one of $Z^1$ and $Z^2$ can be —ZCOOH or —ZCOOX, and Z is $(CH_2)_f$, $CH_2CH_2OCH_2$, or $CH_2CHOHCH_2$;

Formulas (IVa) and (IVb) embrace betaines, sulfobetaines (sultaines), glycinates and propionates, which are commercially available and/or can readily be synthesized. Examples of preferred amphoteric surfactants include fatty betaines such as lauryl dimethyl betaine (e.g. REWOTERIC® AM-DML-35)(this and all other REWOTERIC®-branded compounds are marketed by Witco Corp.) and N-lauryl-beta-iminopropionic acid, mono-sodium salt (e.g. REWOTERIC® AM-LP); glycinates such as N-cocoylamidoethyl-N-(2-hydroxyethyl)-N-carboxymethyl glycine, sodium salt (e.g. REWOTERIC® AM-2C-W) and as lauryl hydroxy sultaine (e.g. REWOTERIC®-AM-B-15); propionates such as sodium cocoamphopropionate (e.g. REWOTERIC® AM-KSF-40); and sulfobetaines such as lauryl hydroxy sultaine (e.g. REWOTERIC AM-CAS).

Preferred $R^4$ groups include alkyl and alkylene radicals derived from fatty acids. Other preferred $R^4$ groups include benzyl and alkyl-substituted benzyl.

Nonionic surfactants include any nonionic compounds having surface active capability. Examples include esters, amides, and alkanolamides, containing a total of 6 to 40 carbon atoms, optionally zero to 3 carbon—carbon double bonds and optionally substituted with 1 to 20 hydroxyl groups (as e.g. polyglycol) esters;

homopolymers, random copolymers and block copolymers of ethylene oxide and/or propylene oxide and/or ethylene glycol and/or propylene glycol, containing 2 to 200 repeating units;

any of the foregoing homopolymers, random copolymers and/or block copolymers, but especially poly(ethylene oxide), substituted with alkyl or alkylene containing 1 to 40 carbon atoms and optionally up to 6 carbon—carbon double bonds, and optionally 1 to 20 hydroxyl groups, or with an ester, amide, amine, alkanolamide or with an aryl group (especially phenyl) or an aryl-alkyl group, itself optionally substituted with alkyl or alkylene containing up to 40 carbon atoms and optionally containing 6 carbon—carbon double bonds; and sorbitol derivatives, including those known guerically as polysorbate -20, -32, -40, -60, -61, -65, -80, -81, and -85.

The particular selection of the type of emulsifier, and the particular compound selected, for any given application can readily be made by those of ordinary skill in this art with reference to the identity or identities of the intended application and the surface properties needed, with due consideration to the amount thereof and to the properties desired of the final product. In particular, the HLB (hydrophilic-lipophilic balance) which needs to be exhibited by the surfactant chosen can likewise be determined quite readily for any particular end-use application.

The critical feature of the discovery represented by the presently claimed invention is the discovery of a carefully chosen class of coupling agents which, in the overall water-based systems disclosed herein, exhibit remarkable and unforeseen properties rendering the resulting compositions superior in many respects to those previously available.

The coupling agents of the aforementioned formula (1), sometimes referred to herein as hydroxy esters, contribute essentially to the advantageous properties of the compositions of the present invention.

The $R^A$ group in formula (1) represents a saturated, straight-chain, branched-chain, or cyclic alkyl moiety containing 1 to 14 carbon atoms. Preferably, $R^A$ contains 3 to 14 carbon atoms, or 1 to 10 or even 1 to 6 carbon atoms. The $R^A$ group can be unsubstituted, or can be substituted with a hydroxyl group or two or three hydroxyl groups.

The residue $R^C$ in formula (1) represents a saturated, straight-chain, branched-chain, or cyclic alkyl moiety containing 1 to 10 carbon atoms. It is preferred that $R^C$ is branched; the term "branched" is intended to encompass structures having one side alkyl chain, more than one side alkyl chain, or one or more side alkyl chains one or more of which is itself branched. Branched structures include cyclic structures substituted with one or more alkyl groups which can be straight or branched. The $R^C$ group is optionally, but preferably, substituted with at least one hydroxyl group and preferably with 2 or 3 hydroxyl groups. Examples of preferred $R^C$ groups include butyl (straight or branched); n-propyl, especially 2,3-dihydroxy-n-propyl (i.e. glyceryl derivatives); and ethyl, especially 1,2-dihydroxy ethyl (i.e. glycol derivatives).

Optionally, the $R^C$ group can be substituted with a group of the formula $—OC(O)—R^E$ wherein $R^E$ is straight, branched or cyclic alkyl containing 1 to 14 carbon atoms and preferably 1 to 4 carbon atoms. $R^E$ itself can optionally be substituted with a hydroxyl group.

Compounds of the formula (1) defined above are in many instances commercially available. Compounds of formula (1) can be prepared in straightforward manner familiar to those of ordinary skill in this art by obtaining or preparing the corresponding precursor polyol of the formula $R^C—(OH)_i$ wherein i is at least 1, or up to 5; and then esterifying one or two of the hydroxyl groups of the polyol precursor with a stoichiometrically appropriate number of moles of the desired corresponding carboxylic acid. In those cases where it is desired to esterify only one of the hydroxyl groups on the precursor polyol, in some embodiments the esterification will preferentially occur at only one of the hydroxyl groups, particularly where one of them is a primary hydroxyl and the other is a secondary hydroxyl. However, in those cases where both hydroxyl groups on the precursor diol might tend to esterify but esterification at only one of the hydroxyl groups is desired, the hydroxyl group at which esterification is desired not to occur can be protected by preliminarily reacting it with a suitable protecting group such as a lower alkyl moiety. Thereafter, following the esterification the protecting group is removed in a known manner. Mixtures of compounds of formula (1), such as where the polyol $R^C—(OH)_i$ is monoesterified but not all at the same hydroxyl group, are also within scope of this invention.

Preferred examples of compounds of the foregoing formula (1) include any one, or mixtures, of compounds obtained by esterification between a $C_2$–$C_{16}$ carboxylic acid and: glycerine; ethylene glycol; 2,2-dimethyl-1,3-propanediol; 2,2,4-trimethyl-1,3-pentane diol (referred to herein as "TMPD"); 2-ethylhexane-1,3-diol; and 2-butyl-2-ethyl-1,3 propane diol.

Particularly preferred examples of compounds of formula (1) include 2,2,4-trimethyl-1,3-pentanediol monoisobutyrate (commercially available as "Texanol"); hydroxypivalyl hydroxypivalate (e.g. in formula (1), $R^A$ is 1,1-dimethyl-2-hydroxyethyl and $R^C$ is 2,2-dimethyl-3-hydroxypropyl, commercially available from Eastman as "HPHP") (also termed "HPHP Glycol" herein); the 1:1 (molar) ester of 2,2,4-trimethyl-1,3-pentane diol with hydroxypivalic acid; the 1:1 (molar) esters of glycerine, or of ethylene glycol, with hydroxypivalic acid; and the 1:1 (molar) ester of glycerine with a $C_2$ to $C_8$ alkanoic acid, preferably a $C_4$ alkanoic acid.

Compositions in accordance with this invention can also contain one or more compounds of the formula $R^T—(OH)_2$ and/or one or more alkoxylates thereof wherein $R^T$ is straight, branched or cyclic alkyl containing 4 to 12 carbon atoms. Preferred compounds $R^T—(OH)_2$ include TMPD (defined above) and 2-ethylhexane-1,3-diol. The alkoxylates of $R^T—(OH)_2$ can be substituted with one or two terminal poly(alkoxy) chains, each in place of one of the —OH substituents. Each alkoxy unit can be ethoxy, propoxy, or butoxy. Mixtures of types of alkoxy groups, or block copolymers composed of a chain of one type of repeating alkoxy unit attached to a chain of a different type of repeating alkoxy unit, are especially contemplated.

In the alkoxylated diols, the number of repeating units in each poly(alkoxy) chain can be up to 40 but the total of alkoxy units in both chains taken together is up to 40. It is preferred that each chain contains 1 to 10 repeating alkoxy units or more preferably 1 to 5 alkoxy units. The preferred alkoxy chains are poly(ethoxy), or are composed of 1 to 2 ethoxy units capped with a chain of 1 to 5 propoxy units.

Compositions in accordance with the present invention exhibit superior stability, by which is meant that they do not separate into more than one phase even upon standing, without agitation, for prolonged periods of time on the order of a year or longer. They generally form more fluid formulations, require lower levels of the ester of formula (1) than of other coupling agents to function, and are nonflammable with high exposure limits. They also give very easy-to-disperse formulations even when the formulations are highly concentrated, and thus function better in each application. They generally give added fluidity to even difficult to handle surfactants and enable those same surfactants to be dispersed in much colder water and maintain fluidity even at cold temperatures, compared to the performance obtained with other coupling agents.

The compositions of the present invention are particularly useful in applications that take advantage of their ability to disperse hydrophobic material, to stabilize foam, and to enhance the penetration and wetting exhibited by the compositions. Examples of such applications include:

Oil dispersants and oil slick dispersants, wherein one applies onto oil (for instance, onto a film of oil) a sufficient amount of a composition according to the present invention, containing a sufficient concentration of surfactant, such that the composition disperses the oil.

Oil well stimulation and oil recovery aids, wherein one injects into an oil well a composition according to the present invention in order to penetrate into the surface of the borehole and assist liberation of crude oil from the matrix material into the hole, from which it can be brought to the surface.

Vehicles for hydrophobic sheeting agents such as mineral oil and silicone oil. Such oils can readily be dispersed in compositions, according to the present invention, and the resulting formulations are highly satisfactory when sprayed or otherwise applied to a surface (such as freshly washed automobile surfaces) to impart a lustrous, water-repellent film to the surface.

Formulation of fabric and textile softeners, wherein components capable of imparting fabric softening (typically, quaternary ammonium compounds such as di-($C_{12-22}$-alkyl)-di($C_1$–$C_4$ alkyl) ammonium chloride or methylsulfate, or 1,3-disubstituted imidazolinium salts) are incorporated into the composition thereby forming a fluid, monophasic, typically clear composition.

Paper deinking and ink flotation, wherein waste inked paper is pulped as a slurry in an aqueous liquid comprising a composition according to the present invention so that ink is liberated from the paper, and prevented from redepositing onto the paper; typically the ink is dispersed or even fully solubilized in the liquid composition of this invention or when the ink particles are floated from the fibers.

Paper debonding, wherein paper fibers are pulped in the headbox of a papermaking machine as a slurry in an aqueous liquid comprising a composition according to the present invention, just prior to feeding the slurry onto the dewatering screen, to improve the debonding of the fibers and the softness of the paper product formed.

Asphalt emulsions, wherein finely divided asphalt is emulsified (at loadings typically 1–20 wt. %), with or without particulate filler such as sand, in an aqueous phase which comprises the composition according to the present invention.

Hair and skin conditioning formulations, wherein effective amounts (e.g. 0.1 wt. % to 10 wt. % or more) of emollients, humectants, and/or slip and conditioning agents (e.g. organopolysiloxanes and the like) are incorporated with the composition of the present invention to create formulations that are monophasic and can be made to be translucent or even clear or gel structures. Compounds suitable for use as emollients, humectants and conditioners in formulations for skin care or hair care can be found in the CTFA Cosmetic Ingredient Dictionary, 3d Edition, and in the CTFA Cosmetic Ingredient Handbook.

Corrosion inhibitors, wherein an effective amount of a hydrophobic corrosion inhibiting material (such as liquid or waxy-solid fatty ester, paraffinic hydrocarbon or silicone) is dispersed in a composition according to the present invention. The resulting formulation is applied to any surface to which one desires to apply a film that protects against corrosion.

Rinse aids, such as used in automatic dishwashers, wherein application of the composition of the present invention disperses residual hydrophobic matter, including cleaner residues and films.

Suspension concentrates and emulsifiable concentrates of herbicides, pesticides, miticides, fungicides, and/or bactericides, wherein one or more liquid or solid, generally hydrophobic, active ingredients are dispersed in a composition according to the present invention. The concentrate can be applied as is on or around desired vegetation; but is more often mixed (e.g. at the point of use) with water of dilution to form a final formulation having the desired concentration of active ingredient(s). This application takes advantage of the noteworthy property of this invention that addition of the water for dilution does not disrupt the monophasic state, nor the fluidity, of the formulation.

Generally speaking, the amount of coupling agent of formula (1) can range from about 0.1 wt. % or 10 wt. % to about 50 wt. %, with the particular amount readily identified by the formulator. Water may not necessarily be present, but usually is present in amounts that can be up to about 90–95 wt. %.

The one or more surfactants (which may exhibit low solubility in water) will generally be present in amounts on the order of 0.1 wt. % to about 90 wt. %, and similarly the particular amount can readily be ascertained by the formulator. The invention is particularly utilizable in embodiments wherein the amount of surfactant(s), in the aggregate, exceeds 10 wt. %, i.e. 15 wt. % or more. Indeed, it has quite surprisingly been determined that compositions in accordance with the present invention can be prepared wherein the amount of surfactant(s) is at least 20–25 wt. %, or even 30 wt. % or higher, ranging up to 50 wt. % or higher, yet the composition remains monophasic and retains its fluidity and its ability to be compounded with other components without suffering phase separation, turbidity or excessive viscosity.

The compositions of the present invention can also optionally contain other components, depending on the additional properties one may wish to provide in the finished composition. Such additional components include, but are not limited to, additional coupling agents and solvents, thickeners, fragrances, coloring agents, hydrocarbon actives, and so forth.

The compositions of the present invention have particular usefulness in applications not calling for the presence of inorganic or organic salts. It is customary to incorporate quantities of such salts, known often as "builder" salts or "detergency builder" salts, particularly when cleaning functionality like hard surface cleaning is desired. However, the present invention is applicable to a considerable number of utilities that do not need the presence of builder salts, since they are not related to cleaning hard surfaces. The ability of the present invention to be so versatile and functional in applications without builder salts is one of the many unexpected and noteworthy aspects of the present invention.

The following are but a few examples of more particular formulations embodying the compositions of the present invention. These examples are provided for purposed of illustration, and should not be deemed to limit the scope of the invention.

EXAMPLES

| Component (wt. %) | Typical Amount (wt. %) | Exemplary Amount (wt. %) |
|---|---|---|
| Carwash Sheeting Spray | | |
| Dicoco dimethyl ammonium chloride (78% in isopropanol) | 10–30 | 18 |
| HPHP Glycol | 2–10 | 7 |
| Mineral seal oil | 20–30 | 25 |
| Water | 40–60 | 50 |
| Biodegradable Clear Fabric Softener | | |
| Methyl bis (oleylcarboxyethyl 2-hydroxyethyl ammonium methylsulfate (90 wt. % in propylene glycol) | 20–60 | 28 |
| HPHP Glycol | 20–40 | 25 |
| Fragrance/dye preservative | 0.4–2. | 1 |
| Water | 5–60 | 46 |
| Paper Debonder Concentrate | | |
| Di(hard tallow) dimethyl ammonium methylsulfate | 40–80 | 60 |
| HPHP Glycol | 20–50 | 35 |
| Water | 0–20 | 5 |
| Textile Softener Concentrate (cold water dispersible, nonflammable) | | |
| Methyl-1-tallow amidoethyl -2-tallow imidazolinium methylsulfate | 50–75 | 65 |
| HPHP Glycol | 10–20 | 15 |
| TMPD | 10–20 | 15 |
| Water | 0–20 | 5 |
| Oil Field Foam Booster | | |
| Blend of anionic and nonionic surfactants | 30–50 | 30 |
| Alpha-olefin sulfonate | 30–50 | 40 |
| HPHP Glycol | 10–40 | 30 |
| Oil Slick Dispersant | | |
| Nonyl phenol ethoxylate | 10–30 | 20 |
| Dioctyl sulfosuccinate | 10–20 | 15 |
| HPHP Glycol | 5–20 | 15 |
| Water | 50–60 | 50 |
| Low Foaming Automatic Dishwasher Rinse Aid | | |
| Poly(ethoxy)- poly(propoxy)block copolymer | 15–35 | 25 |
| HPHP Glycol | 15–40 | 30 |
| Water | 35–70 | 45 |

What is claimed is:

1. A stable monophasic liquid composition useful as a dispersant of hydrophobic material comprising water; a cationic surfactant, said surfactant present in a concentration of from more than 10 wt % to 50 wt %; and at least 0.1 to 50% by weight of one coupling agent having the structural formula:

$$R^A\text{—}C(O)\text{—}R^C\text{—}(OC(O)R^E)_{0-1}$$

wherein $R^A$ is straight, cyclic or branched alkyl containing 1–14 carbon atoms or straight, cyclic or branched alkyl containing 1–14 carbon atoms substituted with 1 to 3 hydroxyl groups; $R^C$ is straight, cyclic or branched alkyl containing 1–14 carbon atoms or straight, cyclic or branched alkyl containing 1–14 carbon atoms substituted with 1 to 3 hydroxyl groups; and $R^E$ is straight, cyclic or branched alkyl containing 1–14 carbon atoms or straight, cyclic or branched alkyl containing 1–14 carbon atoms substituted with a hydroxyl group, with the provisos that the coupling agent contains 7 to 16 carbon atoms and includes 1 to 3 hydroxyl groups.

2. A composition in accordance with claim 1 wherein $R^A$ is straight, cyclic or branched alkyl containing 1 to 10 carbon atoms or straight, cyclic or branched alkyl substituted with 1 to 3 hydroxyl groups containing 1 to 10 carbon atoms.

3. A composition in accordance with claim 2 wherein $R^A$ is straight, cyclic or branched alkyl containing 1 to 6 carbon atoms or straight, cyclic or branched alkyl substituted with 1 to 3 hydroxyl groups containing 1 to 6 carbon atoms.

4. A composition in accordance with claim 1 wherein $R^C$ is a residue of 2,2,4-trimethyl-1,3-pentane diol, 2-ethylhexane-1,3-diol, 2-butyl-2-ethyl-1,3-propane diol, 2,2-dimethyl-1,3-propane diol, glycerol or ethylene glycol.

5. A composition in accordance with claim 1 wherein said coupling agent is hydroxypivalate hydroxypivalate.

6. A composition in accordance with claim 1 wherein said coupling agent is a hydroxypivalate monoester of 2,2,4-trimethyl-1,3-propane diol.

7. A composition in accordance with claim 1 wherein said coupling agent is a hydroxypivalate monoester of glycerol.

8. A composition in accordance with claim 1 wherein said coupling agent is a hydroxypivalate monoester of ethylene glycol.

9. A composition in accordance with claim 1 further comprising a compound of the formula (2)

$$HO(X\text{—}O)_x\text{—}R^T\text{—}(O\text{—}Y)_yOH \tag{2}$$

wherein $R^T$ is saturated, straight, branched or cyclic alkylene containing 4 to 12 carbon atoms, and each X is ethylene, straight or branched propylene, or straight or branched butylene;

x is 0 to 40;

each Y is ethylene, straight or branched propylene, or straight or branched butylene;

y is 0 to 40;

the sum of (x+y) is 0 to 40.

10. A composition in accordance with claim 9 containing at least one compound of formula (2) wherein the sum of (x+y) is 1–10.

11. A composition in accordance with claim 9 containing at least one compound of formula (2) wherein $R^T$ is the residue of 2,2,4-trimethyl pentane-1,3-diol, and the sum of (x+y) is 1∝10.

* * * * *